United States Patent Office.

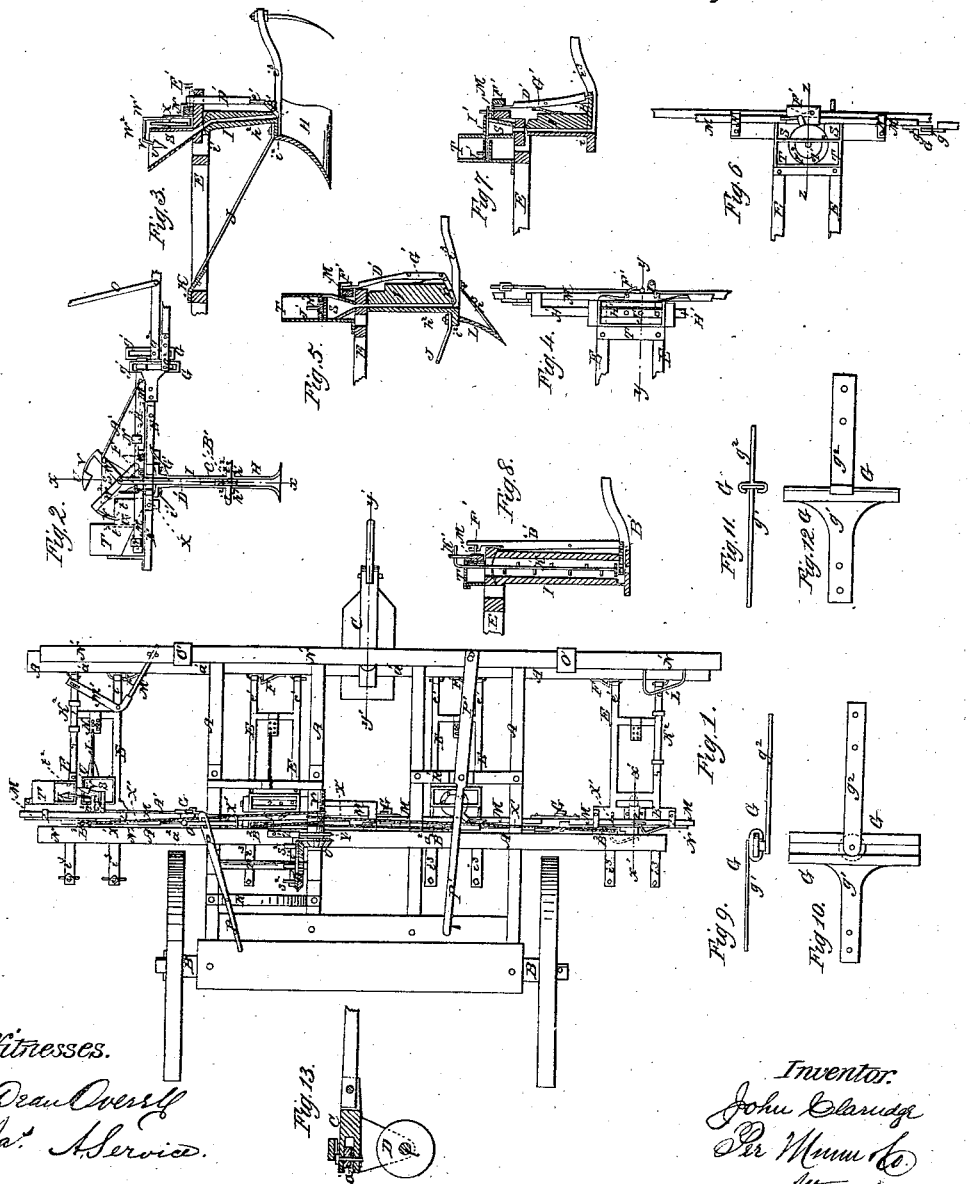

JOHN CLARRIDGE, OF PANCOASTBURG, OHIO

Letters Patent No. 64,076, dated April 23, 1867.

---

IMPROVEMENT IN CORN-PLANTERS.

---

The Schedule referred to in these Letters Patent and making part of the same.

---

TO ALL WHOM IT MAY CONCERN:

Be it known that I, JOHN CLARRIDGE, of Pancoastburg, in the county of Fayette, and State of Ohio, have invented a new and useful Improvement in Corn-Planter; and I do hereby declare that the following is a full, clear, and exact description thereof, which will enable others skilled in the art to make and use the same, reference being had to the accompanying drawings, forming part of this specification, in which—

Figure 1 is a top or plan view of my improved corn-planter.

Figure 2 is a detail rear view of a portion of the planter, showing one arrangement for dropping the seed.

Figure 3 is a detail sectional view, taken through the line $x$ $x$, fig. 2.

Figure 4 is a detail top view of a portion of the planter, showing another arrangement for dropping the seed.

Figure 5 is a detail sectional view, taken through the line $y$ $y$, fig. 4.

Figure 6 is a detail top view of a portion of the planter, showing another arrangement for dropping the seed.

Figure 7 is a detail sectional view of the same, taken through the line $z$ $z$, fig. 6.

Figure 8 is a detail sectional view, taken through the line $x'$ $x'$, fig. 1.

Figure 9 is a modification of the coupling that connects the several ploughs and slide-bars to each other.

Figure 10 is a side view of the same.

Figure 11 is a top view of another modification of the coupling that connects the several ploughs and slide-bars to each other.

Figure 12 is a side view of the same.

Figure 13 is a detail sectional view, taken through the line $y'$ $y'$, fig. 1.

Similar letters of reference indicate like parts.

My invention has for its object to furnish an improved corn-planter, by means of which the corn may be dropped promptly and accurately, and covered properly, and which may adjust itself to the unevenness of the ground over which it passes; and it consists, first, in the steel plough, constructed and attached to the shank, in the manner hereinafter more fully described; second, in the combination of the parts for operating the valves; third, in the combination of the circular revolving valve with the seed reservoir, hopper, and sliding bar; fourth, in the combination of upwardly-projecting stirring-pins with the valves, whether circular or rectilinear, and with the seed reservoirs; fifth, in the combination of a vertical stirring-shaft, having horizontal arms, with the seed reservoir and plough-shank, and with the sliding bars; sixth, in the coupling which connects the sliding bars and plough-frames with each other; seventh, in the combination and arrangement of the seed reservoir, hopper, cups, arms, levers, and connecting-rods with each other, with the sliding bar, and with the frame of the plough; eighth, in the combination of the levers and sliding bars with each other, with the plough-frames, and with the frame of the planter; ninth, in the combination of the cords, pulleys, shaft, ratchet-wheel, pawl, bevel-gear, and foot-wheel with each other, with the plough-frames, and with the frame of the planter; tenth, in the combination of the tongue-block and centre-wheel with each other and with the frame of the planter; eleventh in the combination of the lever, slide-bar, and bent lever, or equivalent, with each other, with the sliding bars, and with the frame of the planter, the whole being constructed and arranged as hereinafter more fully described.

A is the frame of the corn-planter, the rear end of which is supported by, and attached to, the axle B. The forward part of the frame A is supported by the tongue-block C and wheel D. The tongue-block C is made in the form shown in figs. 1 and 13, and it is pivoted to the centre of the front cross-timber $a^1$ of the frame A. This enables the planter to be turned around in a very small space. E are the frames of the ploughs, the forward ends of the beams $c'$ of which have eyes formed upon them, which are passed over hooks attached to the front cross-timber $a^1$ of the frame A; and they are held in place by the buttons F, as shown in fig. 1. The rear ends of the adjacent plough-frames E are connected to each other by the coupling G. This coupling consists of two parts $g^1$ and $g^2$. The part $g^1$ is of the form shown in fig. 2, having a vertical slot formed in it, as shown. This part $g^1$ is securely attached to the end of the rear cross-bar of the plough-frame E. To the contiguous end of the rear cross-bar of the adjacent plough-frame is attached the other part, $g^2$. This part is a block, having a vertical slot or groove cut in it, into which the edge of the part $g^1$ enters, and is secured in place by a pin passing through a slot in the part $g^1$, and through the slotted end of the part $g^2$, as shown in figs. 1 and 2. This enables any one of the ploughs, independently of the others, to rise so as to pass over any obstruction without interfering in the least with the proper operation of any of the parts. Figs. 9, 10, 11, and 12 represent modifications of the coupling G. In the modification shown in figs. 9 and 10 the slot in the piece $g^1$ is replaced with a vertical groove, in which plays a button-head, attached to the end of the part $g^2$; and in the modification shown in figs. 11 and 12 the slot in the piece $g^1$ is replaced by a vertical cross-head, which works in a groove formed upon the end of the piece $g^2$, as shown. H is a plough, which is made of two pieces of plate steel, cut out and formed into the proper shape, and the forward edges of which are brazed or welded together. Upon the upper-side edges of the plough H are formed two ears $h^1$, by means of which the plough is bolted to the lower end of the hollow shank I. $h^2$ is a bolt, welded or otherwise securely attached to the forward part of the upper end of the said plough H, and which passes through the lower end of the hollow shank I, to which it is secured by a nut, as shown in fig. 3. To the bolt $h^2$ is also secured the rear end of the rod J, by means of which the pitch of the plough is regulated. The rod J has a hook formed upon its forward end, which hooks into one or the other of the holes in the plate K, attached to the frame E of the plough, as shown in figs. 1 and 3, according as the pitch of the plough is desired to be greater or less. If desired, the steel plough H may be replaced with a shovel-plough, L, which, in addition to the bolt $h^2$, should be further strengthened by braces $h^3$, extending from the rear side of the shovel up to the lower end of the hollow shank I, as shown in fig. 5. The head $i^1$ of the hollow shank I is made convex on both its upper and under side, as shown in fig. 3, so that it may roll easily upon its bed-plate, when changing the pitch of the plough, by shifting the rod J; and the lower end of the said shank I is cast with a flange, $i^2$, projecting in front and at the sides, for convenience in attaching the ploughs. It is also cast with rearwardly-projecting arms $i^3$, to which bull-tongue or narrow shovel-ploughs may be attached, for assisting in covering the corn. M are slide-bars, which work back and forth horizontally upon the upper sides of the rear ends of the plough-frames E, where they are kept in place by the clasps N, as shown in the drawings. The bars M are connected to each other by the couplings G, hereinbefore described. O is a lever, the lower end of which is pivoted to one of the sliding bars M. The lever O passes up through a staple or keeper attached to the cross-piece $a^2$ of the frame A, which forms its fulcrum; thence it passes through a slot formed in the end of the lever P. The lever P has its fulcrum upon a support, R, attached to the frame A, as shown in fig. 1, and extends back into such a position that it can be reached and operated by the driver from his seat. S is the seed hopper, the discharging orifice of which communicates directly with the cavity of the hollow shank I, as shown in fig. 3. T is the seed reservoir, the main part of which is furnished with a slide-gate, $t$, as shown in dotted lines in fig. 2, by means of which the flow of corn into the box or trough $t^2$ may be regulated. U are cups, which take the corn, in proper quantities to form single hills, from the box or trough $t^2$, and deposit it in the hopper S. The cups U are attached to the ends of the arms V, the other ends of which are attached to the ends of the levers $W^1$ $W^2$, as shown in figs. 1, 2, and 3. The levers $W^1$ $W^2$ are pivoted to a support, X, attached to the frame E of the plough. The levers $W^1$ and $W^2$ are operated by rods $A^1$ and $A^2$, one end of which is pivoted to the sliding bar M. The other end of the rod $A^1$ is pivoted to the upper end of the lever $W^1$, near the arm V, and the other end of the rod $A^2$ to the lower end of the lever $W^2$, projecting below the pivoting point of the said lever, so that the cups U may always be moving in opposite directions, and the one be filling itself in the box $t^2$ while the other is discharging its contents into the hopper S. The corn passes from the hopper S to the lower part of the hollow shaft I, where it rests upon the valve $B^1$ until dropped into the furrow by the operation of the said valve. The valve $B^1$ is pivoted in the lower part of the hollow shaft I, as shown in fig. 3, and its projecting end is pivoted to the lower end of the screw $C'$, which screws into the lower end of the bar $D'$, so that the length of the said bar $D'$ may be adjusted as the position of the hollow shaft I is changed in regulating the pitch of the plough, as before described. The bar $D'$ works up and down in a groove formed in the rear side of the hollow shank I, and has a pin, $E'$, inserted in its upper end, which, when the valve $B^1$ is closed, rests upon the upper surface of the rear part of the plough-frame E. $F'$ are small inclines, pivoted to the side of the sliding bar M, which are held down, with their edges resting upon the upper surface of the frame E, by small springs attached to the bar M, as shown in fig. 2. As the bar M is moved in one or the other direction, the point of the one or other of the inclines $F'$ passes beneath the pin $E'$, raising the bar $D'$, opening the valve $B^1$, and dropping the corn into the furrow. When the pin $E'$ reaches the upper end of the incline $F'$, up which it is passing, it drops down again to the frame E, closing the valve $B^1$, and passes on beneath the other incline, as shown in fig. 2. The two inclines $F'$ may be made in one piece, and solidly attached to the bar M, allowing the pin $E'$ to pass up one side and down the other, closing the valve $B^1$ in time to receive the corn from the next cup. $G'$ is a spring, one end of which is attached to the frame E, and the other end enters a hole formed in the bar $D'$. The object of this spring is to make the bar $D'$, when released from the inclines $F'$, drop down and promptly close the valve $B^1$. If desired, the corn may be passed from the seed reservoir to the hopper, from which it passes to the hollow shank I by a straight sliding valve, $H'$, attached to, and operated by, the sliding bar M, and having holes through it large enough to contain the proper amount of corn for a hill. These holes receive the corn, and carry it outside the reservoir, when it drops into the hopper, and passes into the hollow shaft, as shown in figs. 4 and 5. This allows the stirring-pin $J'$ to be placed between the holes in the valve, and to pass from one side of the seed reservoir T to the other, so as to keep the corn in said reservoir thoroughly stirred; or, the same thing may be done by a circular revolving valve $I'$, the holes of which receive the corn, and carry it to the rear of the reservoir, where it falls into the hopper, and passes into the hollow shaft I. In the last two cases the valves $H'$ and $I'$ should be provided with an upwardly-projecting pin, $J'$, which, as the valves are operated, may keep the corn stirred to prevent its clogging. When the valves $H'$ or $I'$ are used the seed reservoirs T are placed directly above the hoppers S; and the rear side of said hoppers is cut away, so that the driver, from his seat, can see, at all times, whether the dropping apparatus is operating properly. The bar $D'$ may be changed into a lever by pivoting it to the sides of the groove in the hollow shank I, in which it works, the inclines $F'$ being so placed as to push out the upper end of said lever, as shown in figs. 4 and 5, or to draw it in, as shown in figs. 6 and 7, the valve B' being either pivoted to the shank I, and to the lower end of said bar or lever, as shown in fig. 5, or working in grooves, and connected to said bar or lever by a tenon and slot, as shown in fig. 7. In this case the spring G' should be placed within the groove in the hollow shank I, and should press outward against the bar or lever D', as shown in figs. 5 and 7. The reservoir T and hollow shank I may be converted into a continuous seed receptacle, as shown in fig. 8, by enlarging the cavity in the said hollow shank, and dropping the corn from the valve B', which should have two holes in it, as shown, so as to drop corn enough for one hill at each stroke. In this case a vertical rod, $K^1$, provided with horizontal arms and moved by the motion of the sliding bars M, should be placed therein to keep the corn stirred, as shown in fig. 8. The couplings G may be dispensed with by turning the sliding bars M, seed reservoirs T, hoppers S, and their attachments, one-quarter around, so that said bars M may work upon, and parallel with, the bars $e'$ of the frame E, as shown at $K^2$, fig. 1, and operating them by means of inclines L', or bent levers M', attached to the sliding bar N', which works in slides O', attached to the bar $a^1$ of the frame A, as shown in fig. 1. P' is a lever, pivoted to a support, R', attached to the frame A. The forward end of the lever P' is pivoted to the sliding bar N', and its rear end extends back, so that it can be reached and operated by the driver from his seat. $S^1$ is a foot-wheel, attached to the shaft T', which revolves in bearings upon the frame A of the planter. From one side of the wheel $S^1$ project pins $S^2$, by means of which the driver can operate the said wheel with his foot. Upon the other side of the wheel $S^1$ are formed bevel-cogs or teeth, which mesh into the bevel gear-wheel U', attached to the end of the shaft V'. The shaft V' revolves in bearings upon the frame A, and to it are attached the ends of the ropes X'. The ropes X' pass along the bar $a^2$ of the frame A over pulleys $B^2$, pivoted to the side of said bar, and are attached to the rear ends of the plough-frames E. The ropes X' are of such length, and are so arranged, that, by turning the shaft V' by means of the foot-wheel $S^1$, all the plough-frames E will be raised at the same time and equally from the ground. Y' is a ratchet-wheel, attached to the shaft V'; and Z' is a pawl, attached to the frame A, by means of which the said shaft V' may be held securely in any desired position.

What I claim as new, and desire to secure by Letters Patent, is—

1. The steel plough H, when constructed and attached to the shank I, substantially as herein described and for the purpose set forth.

2. The combination of the slide-bars M, the inclines F', or equivalent, arms or levers D', and valve $B^1$, with each other and with the plough-frame E, substantially as described and for the purpose set forth.

3. The combination of the circular valve I' with the seed reservoir T, hopper S, and sliding bar M, substantially as herein described and for the purpose set forth.

4. The combination of the upwardly-projecting pins J' with the valves H' or I' and with the seed reservoirs T, substantially as herein described and for the purpose set forth.

5. The combination of the vertical stirring-shaft $K^1$, having horizontal arms, with the seed reservoir T, hollow shank I, and with the sliding bar M, substantially as described and for the purpose set forth.

6. The coupling G, when constructed substantially as herein described and for the purpose set forth.

7. The combination and arrangement of the seed reservoir T, hopper S, arms V, levers $W^1 W^2$, and connecting-rods $A^1 A^2$ with each other, with the sliding bar M, and with the plough-frame E, substantially as herein described and for the purpose set forth.

8. The combination of the levers O and P and sliding bars M with each other, with the plough-frames E, and with the frame A of the planter, substantially as described and for the purpose set forth.

9. The combination of the cords X', pulleys $B^2$, shaft V', ratchet-wheel Y', pawl Z', bevel-wheel U', and foot-wheel $S^1$ with each other, with the plough-frames E, and with the frame A of the planter, substantially as herein described and for the purpose set forth.

10. The combination of the lever P', slide-bar N', and bent lever M', or equivalent, with each other, with the slide-bars M, and with the frame A of the planter, substantially as described and for the purpose set forth.

11. The combination of the shovel-plough L and strengthening-rods $h^3$ with each other and with the flanged lower end of the hollow shank I, substantially as described and for the purpose set forth.

12. Constructing the hollow shank I with a double-convex head, $i^1$, cast upon its upper end, and a projecting lange, $i^2$, and arms, $i^3$, upon its lower end, substantially as described and for the purpose set forth.

13. Placing the seed reservoirs T directly above the hoppers S, and cutting away the side of said hoppers substantially as described and for the purpose set forth.

The above specification of my invention signed by me this 16th day of July, 1866.

JOHN CLARRIDGE.

Witnesses:
WM. F. McNAMARA,
JAMES T. GRAHAM.